United States Patent [19]

Amundson et al.

[11] Patent Number: 4,685,701
[45] Date of Patent: Aug. 11, 1987

[54] SHOPPING CART CADDY

[76] Inventors: Anita L. Amundson, 1133 New Pear St., Vineland, N.J. 08360; Joseph Tokay, 1 Tree La., Levittown, Pa. 19054

[21] Appl. No.: 886,172

[22] Filed: Jul. 16, 1986

[51] Int. Cl.[4] .................... B42D 9/00; B42D 17/00; G09F 9/00; A47B 5/00
[52] U.S. Cl. .................................. 281/42; 281/45; 364/705; 248/441.1
[58] Field of Search ............... 281/42, 45, 31; 40/19, 40/308, 316; 108/44, 42; 224/30 A, 42.42; 248/441.1, 452, 460; 280/DIG. 4; 364/705

[56] References Cited

U.S. PATENT DOCUMENTS

| | | | |
|---|---|---|---|
| D. 241,381 | 2/1975 | Garnier | 281/31 |
| 2,219,091 | 10/1940 | Henderson | 248/452 |
| 2,307,143 | 1/1943 | Littlejohn | 281/42 |
| 3,041,763 | 7/1962 | Knox | 248/441.1 |
| 3,416,817 | 12/1968 | Gia-Quinto | 281/42 |
| 4,156,318 | 5/1979 | Economy | 281/45 |
| 4,222,109 | 9/1980 | Siwula | 364/705 |

Primary Examiner—E. R. Kazenske
Assistant Examiner—Paul M. Heyrana, Sr.
Attorney, Agent, or Firm—Brady, O'Boyle & Gates

[57] ABSTRACT

A book-like shopping cart attachment rests on the cart pushing handle at a convenient angle for viewing by a shopper in a supermarket or other store. The device can mount a hand calculator, note paper, a pencil and coupon holding clips. Attaching hooks engage a cross bar of the cart near and below the pushing handle and the hooks are pivotally connected to a center bar of the device and are limited in their swinging movement in one direction by a stop plate, whereby the hooks always assume a proper angle to stabilize the device during its use on the cart.

10 Claims, 3 Drawing Figures

SHOPPING CART CADDY

BACKGROUND OF THE INVENTION

1. Technical Field:

The present invention relates to improvements in customer convenience attachments for supermarket shopping carts and the like.

2. The Prior Art:

Attachments for shopping carts which promote their convenience and usage by customers in supermarkets and other stores are known in a variety of forms. Generally speaking, devices of this type in the prior art have not met with wide public acceptance for several reasons. Some of the devices are far too complex and costly to make them practical to manufacture and sell. Others are too large and unwieldly to satisfy the desires of users. Still other devices require more-or-less permanent attachment to the cart and others are not sufficiently stable in their mountings on the cart to satisfy the needs of store customers.

The objective of the present invention, therefore, is to provide a shopping cart convenience attachment or caddy which is easily attached by a customer to a commonly used cart, and which during periods of non-use can be folded like a book and placed in a purse or in an automobile glove compartment.

A further object of the invention is to provide a shopping cart caddy of extremely simplified and economical construction which is supported on the cart during use stably and in an optimum position for easy reading and for checking off items on a grocery list, as well as operating a small calculator forming a part of the attachment.

Still another object of the invention is to provide a customer convenience attachment for shopping carts having simplified and reliable, easily releasable attaching means which utilizes gravity in supporting a "backbone" member of the attachment on the pushing handle of the cart while pivoted attaching hooks are engaged with a cross rod of the cart below and somewhat forwardly of the pushing handle.

Other objects and advantages of the invention will become apparent during the course of the following detailed description.

SUMMARY OF THE INVENTION

The invention is best summarized as a folding book-like shopping cart attachment equipped on its opposite side folding leaves with a note pad and hand calculator. A center backbone member of the attachment rests solidly on the shopping cart handle at a convenient viewing angle and is stabilized by pivoted releasable attaching hooks which engage a rod of the cart forwardly of and below the pushing handle. The hooks are hinged to the backbone member and are restrained in their swinging movement in one direction by a stop plate on the backbone member. When the device is removed from the cart and folded for storage, the hooks straddle the folded leaves of the device and tend to hold the leaves in their closed or folded positions for added convenience.

DETAILED DESCRIPTION

Figure 1:
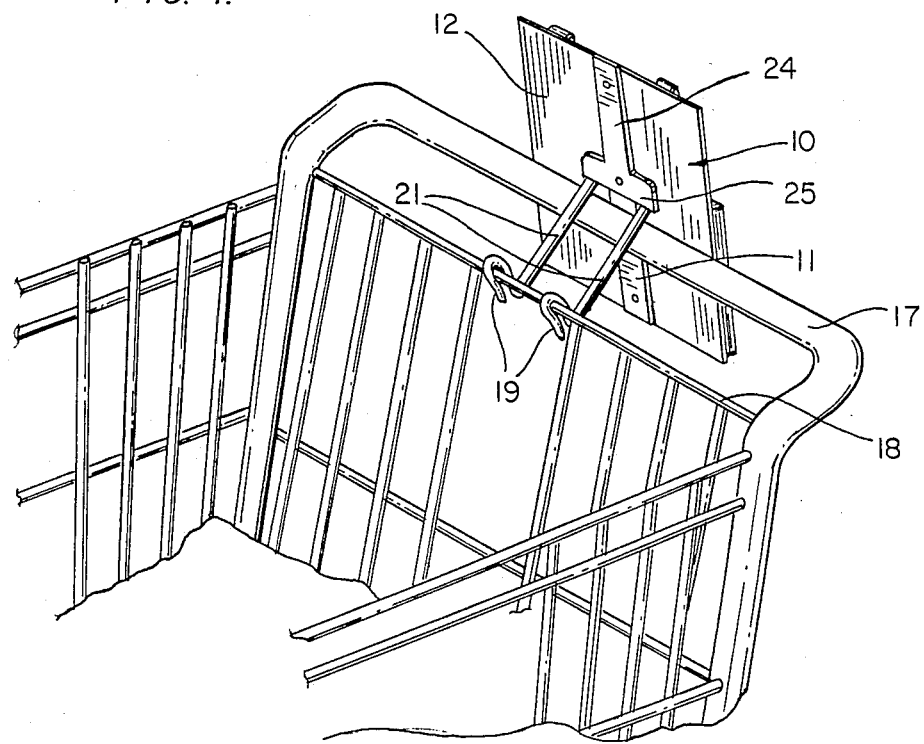
FIG. 1 is a perspective view of a shopping cart equipped with a caddy in accordance with the present invention.

Referring to the drawings in detail wherein like numerals designate like parts, a shopping cart convenience attachment 10 or caddy forming the subject matter of this invention includes a center top-to-bottom backbone bar 11 which is preferably quite rigid bounded on its opposite sides by rectangular leaves or wings 12 to form a book-like structure. The leaves 12 are suitably hingedly attached to the backbone bar 11 so that the caddy 10 can assume a flat configuration, FIGS. 1 and 2, during use or a folded configuration, FIG. 3, for convenient storage in a purse or automobile glove compartment.

Figure 2:
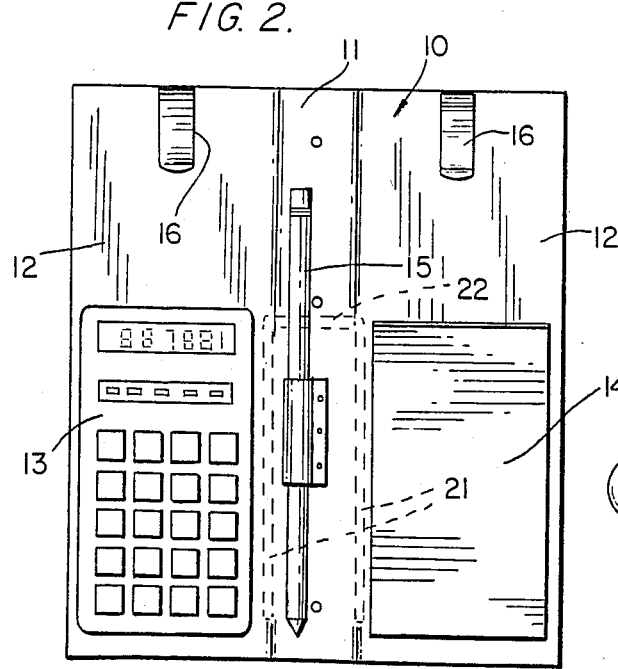
FIG. 2 is a front elevational view of the caddy in its open for use position.

Referring to FIG. 2, the caddy 10 is provided on the front face of one leaf 12 with a small calculator 13 suitably fixed thereto and on the corresponding face of the other leaf 12 with a note pad 14 suitable for making a shopping list. A pen or pencil 15 is held on the center backbone bar 11 between the two leaves 12, and spring clips 16 for securing discount coupons are provided at the top edges of the leaves 12. Other types of convenience attachments may be included on the caddy 10, in some cases.

The caddy 10 is conveniently releasably attached to a conventional shopping cart shown in FIG. 1 having a push bar 17 and a parallel transverse rod 18 disposed somewhat forwardly of the push bar and slightly below it, as shown in the drawings.

Figure 3:
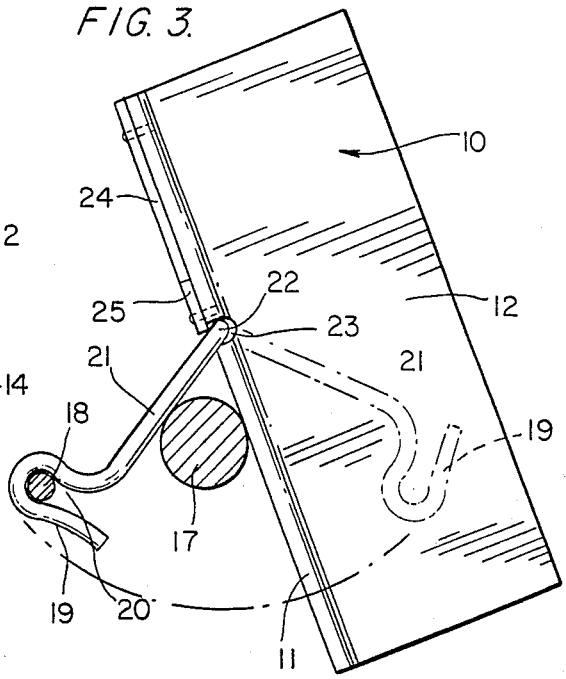
FIG. 3 is a side elevation of the caddy, partly in cross section, and showing the opposite side leaves thereof folded in parallel relationship.

The caddy carries releasable attaching hooks 19 which engage the rod 18 with a light snap-locking action due to the provision of a restricted passage or throat 20, FIG. 3. The two hooks 19 which are spaced apart by a distance roughly equal to the thickness of the caddy 10 when the leaves 12 are folded are carried by parallel arms 21 connected by a transverse bight portion 22 which is pivotally received within an opening 23 formed through the backbone bar 11 near and somewhat above its longitudinal center.

A stop plate 24 for the two arms 21 is fixed to the exterior of the backbone bar 11 and carries two side extensions 25 whose lower edges define a positive stop surface which limits swinging the arms 21 and hooks 19 away from the backbone bar 11 in one direction, as best shown in FIG. 3. When the arms 21 are engaged with the stop extensions 25, they define an acute angle of approximately 45° with the backbone bar 11. Consequently, when the hooks 19 are engaged with the rod 18, the pivoted arms 21 can rest on the shopping cart push bar 17 while the backbone bar 11 simultaneously rests on the opposite side of the push bar 17. Since the stop extensions 25 prevent further separation of the arms 21 and backbone bar 11, the caddy rests solidly with the assistance of gravity on the push bar 11 while being anchored through the hooks 19 to the rod 18.

When the leaves 12 are separated to lie in a common plane, FIG. 1, they assume a convenient angle relative to the user of the cart for viewing the shopping list or checking off items thereon, or for writing on the pad 14, and using the calculator 13. The caddy is quite stable in its mounting on the shopping cart and does not tend to be displaced from its use position until the hooks 19 are forcibly separated from the rod 18. The two leaves 12, when in the use position, are further stablized by contact with the push bar 17 and extensions 25.

A further feature of the invention resides in the use of the pivoted arms 21 and hooks 19 to secure the leaves 12 in folded approximately parallel relationship when the caddy 10 is separated from the shopping cart for storage in a purse or the like. The arms 21 are swung into straddling relationship with the folded caddy, as indicated in phantom lines in FIG. 3, and then serve to resist opening or separation of the folded leaves 12, which they frictionally engage.

The invention is characterized by extreme simplicity, economy of manufacturing, durability and convenience of use. Its uncomplicated nature, its compactness and its ready attachability and removal from the shopping cart render the invention practical where much of the known prior art has proven to be impractical.

It is to be understood that the form of the invention herewith shown and described is to be taken as a preferred example of the same, and that various changes in the shape, size and arrangement of parts may be resorted to, without departing from the spirit of the invention or scope of the subjoined claims.

We claim:

1. A shopping cart caddy comprising a backbone bar, a pair of leaves hinged to opposite sides of the backbone bar and adapted to lie substantially in a common plane with the backbone bar and to be folded approximately into parallelism, shopper convenience items carried by corresponding faces of said leaves, a pair of hooks releasably engageable with a horizontal rod of a shopping cart, a bifurcated member including a pair of parallel arms carrying said hooks and being pivotally secured to the caddy intermediate the length thereof, and a stop element on the caddy engageable with said arms to positively limit swinging movement of the arms away from the backbone bar in one direction whereby said arms and backbone bar may assume a predetermined acute angular relationship and the arms and backbone bar straddle and come to rest solidly on a push bar of a shopping cart when in use, with said leaves and backbone bar disposed at a convenient angle for reading.

2. A shopping cart caddy as defined in claim 1, and wherein said bifurcated member further includes a bight portion of a length spanning the width dimension of the backbone bar interconnecting ends of said arms remote from said hooks and being pivotally engaged with the backbone bar, and the stop element being secured to the backbone bar and having a pair of orthogonal side extensions in the path of movement of said arms for restricting movement thereof, said arms being swingable forwardly to straddle and engage the leaves when said leaves are folded closed into approximate parallelism and then preventing unfolding of the caddy when not in use.

3. A shopping cart caddy as defined in claim 2 wherein said bight portion engages the backbone bar substantially midway along its length.

4. A shopping cart caddy as defined in claim 3 wherein said orthogonal side extensions are located adjacent said bight portion.

5. A shopping cart caddy as defined in claim 2 wherein said stop element comprises a flat planar member.

6. A shopping card caddy as defined in claim 3 wherein said acute angular relationship comprises an angle of substantially 45°.

7. A shopping cart caddy as defined in claim 1, and said convenience items including a note pad on one leaf, a calculator on the other leaf, coupon clips at the tops of the leaves, and a writing implement on the backbone bar between said leaves.

8. A shopping cart caddy as defined in claim 1 wherein the length of the backbone bar and the pair of leaves are substantially equal.

9. A shopping cart caddy as defined in claim 1 wherein said arms are comprised of rod type elements.

10. A shopping cart caddy adapted to be releasably held on a shopping cart having a push bar and a rod spaced from the push bar and parallel thereto, said caddy comprising a folding book-like body portion including opposite side hinged leaves and shopper convenience elements carried by said leaves, a pair of spaced hooks on the caddy releasably engageable with said rod, a bifurcated rod type member including a pair of spaced parallel arms carrying said hooks at one end and being connected at corresponding opposite ends by a bight portion pivotally connected to the caddy near the center of the caddy, and a planar cruciform stop element for said arms on the caddy engaging the arms and limiting swinging movement of the arms relative to the caddy in one direction, whereby the arms can assume a predetermined acute angular relationship to the caddy, typically 45°, said arms being swingable freely in an opposite direction whereby the arms and hooks can straddle and engage the leaves of the caddy when the caddy is folded to prevent opening thereof.

* * * * *